United States Patent [19]

Born et al.

[11] 4,100,507
[45] Jul. 11, 1978

[54] METHOD FOR EXCITING A GAS DYNAMIC $CO_2$ LASER AND APPARATUS FOR PERFORMING THE METHOD

[75] Inventors: Gunthard Born, Taufkirchen; Hans Hermansdorfer, Unterpfaffenhofen; Gunther Sepp, Ottobrun; Gerhard Grosch, Munich, all of Fed. Rep. of Germany

[73] Assignee: Messerschmitt-Bolkow-Blohm GmbH, Munich, Fed. Rep. of Germany

[21] Appl. No.: 769,780

[22] Filed: Feb. 17, 1977

[30] Foreign Application Priority Data

Feb. 28, 1976 [DE] Fed. Rep. of Germany ....... 2608305

[51] Int. Cl.² ............................................. H01S 3/02
[52] U.S. Cl. .......................................... 331/94.5 G
[58] Field of Search ..................... 331/94.5 G, 94.5 D

[56] References Cited

U.S. PATENT DOCUMENTS

| | | | |
|---|---|---|---|
| 3,900,802 | 8/1975 | Milling | 331/94.5 G |
| 3,984,784 | 10/1976 | Pinsley | 331/94.5 G |

*Primary Examiner*—William L. Sikes
*Assistant Examiner*—Marcus S. Rasco
*Attorney, Agent, or Firm*—W. G. Fasse; W. W. Roberts

[57] ABSTRACT

The present method relates to exciting a gas dynamic $CO_2$ laser, especially at high stagnation temperatures above 2500° K and at a combustion chamber pressure above 50 bar. A liquid fuel and a liquid oxidizer are injected into the combustion chamber at these operating parameters and the produced laser gas is caused to flow through a Laval nozzle into a resonator. The flow cross sectional area of the Laval nozzle adjacent to the resonator is at least 100 times larger than the flow cross sectional area adjacent to the nozzle neck facing the combustion chamber. The flow of the laser gas through this nozzle cools the gas to about 300° K, whereby an inversion state is produced. The laser for performing this type of operation has a combustion chamber connected through the above mentioned nozzle to a resonator which in turn is connected to a diffuser. A tank for liquid fuel and a tank for a liquid oxidizer are connected to the respective injection nozzles of the combustion chamber, whereby the respective conduits preferably extend through cooling jackets of the combustion chamber of the diffuser.

10 Claims, 1 Drawing Figure

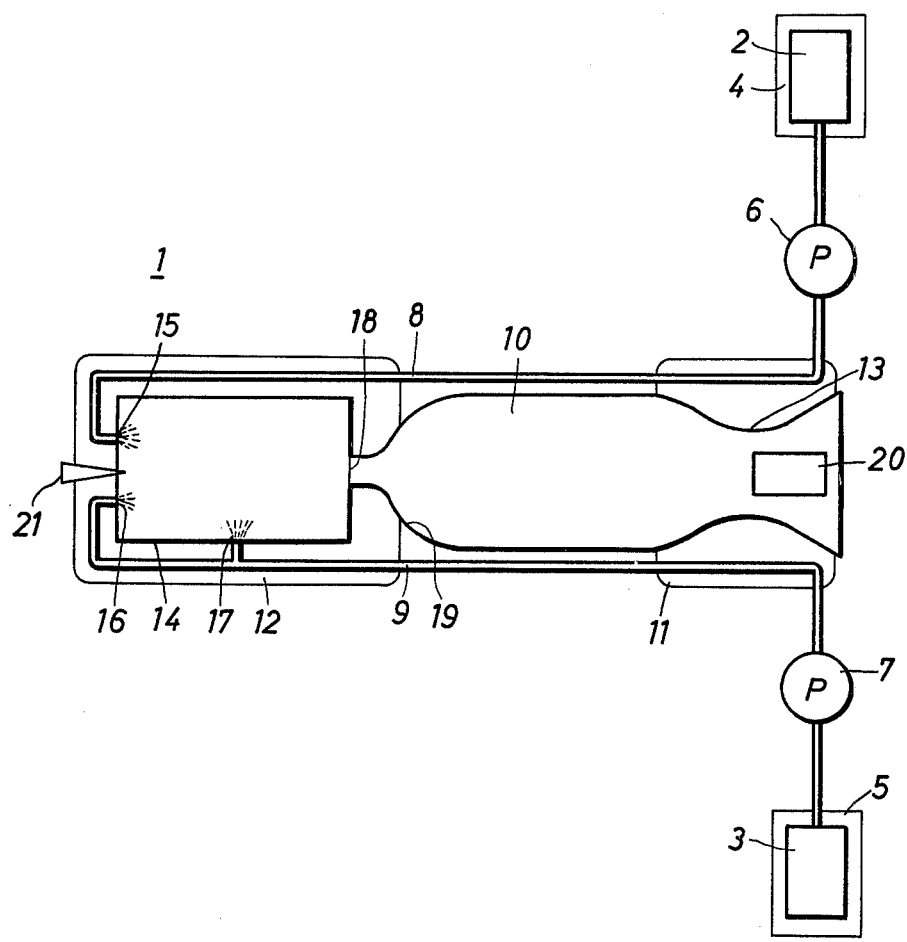

METHOD FOR EXCITING A GAS DYNAMIC $CO_2$ LASER AND APPARATUS FOR PERFORMING THE METHOD

BACKGROUND OF THE INVENTION

The invention relates to a method for exciting a gas dynamic $CO_2$ laser, especially at high stagnation temperatures and to a laser device for performing such excitation method. The gaseous laser medium resulting from the combustion in a combustion chamber expands through a Laval nozzle and flows through the resonator at supersonic speeds, whereby the gaseous laser medium is available in the inversion state.

To satisfy the foregoing requirements, it is known to combust gaseous or liquid fuels such as CO, $H_2$, $CH_4$, $C_6H_6$, $C_2N_2$, with $O_2$ or $N_2O$, whereby the combustion gases are thinned down substantially by the addition of $N_2$ so that the $CO_2$ content does not exceed a concentration of about 5 to 10%. It is known that for operation at combustion chamber pressures above about 50 bar and Laval nozzle configurations with neck diameters of about 0.1 to 1.0mm, a low $CO_2$ concentration is necessary in order to establish a population inversion in the resonator. Such population inversion requires that a deactivation of the thermally excited vibration level, which is coupled with the upper laser level, is avoided as the laser medium flows through the Laval nozzle. Such deactivation could be the result of collision relaxation which thus is to be avoided. Reference is made in this context to an article entitled "PULSED GASDYNAMIC LASERS" by Walter H. Christiansen, AIAA Paper No. 71-572, AIAA 4th Fluid and Plasma Dynamics Conference, Palo Alto, Calif., June 21-23, 1971.

However, where the operation takes place under the known operating conditions with chemical reactions resulting in a combustion product comprising $N_2$ and a $CO_2$ content less than about 10% as well as a desired $H_2O$ content below about 5%, the stagnation temperatures T that may be realized are also below 2500° K. Thus, the theoretically obtainable laser power related to the mass throughput is also limited. This laser power increases proportionally to $1/(exp(3380/T)-1)$ according to an article entitled "GASDYNAMIC LASERS" by Edward T. Gerry, published in IEEE Spectrum No. 7, page 51, 1970. As a result, the operating costs rise accordingly and a respectively large expense for the storage and conveying of the required large fuel quantities cannot be avoided. Such large expense applies especially to the $N_2$ component of the prior art method if this component is stored in its gaseous state. This is so, because the gaseous $N_2$ component requires relatively large and heavy containers maintained under high pressure which in turn requires expensive compressors of the large volume type with a respectively large power requirement.

It is further known to admix to the fuel mixture liquid nitrogen having a temperature of 77° K. For this purpose it is also necessary to make the nitrogen $N_2$ available in expensive cryogenic containers. Due to the low temperature of the nitrogen $N_2$, this method achieves only combustion chamber temparatures which are about 200° K below those temperatures which may actually be achieved in the above admixing of gaseous $N_2$ to the fuel. As a result, the required mass consumption is even higher and so are the overall costs.

In prior art methods, the stagnation temperature is positively limited to T $\lesssim$ 2500° K, which in turn requires the use of Laval nozzles having an area ratio $\lesssim$ 100 in order to obtain a gas temperature of about 300° K in the resonator which is advantageous for the laser amplification. Prior art types of operation further require that the entrance or neck diameters of the Laval nozzles are small, namely about 0.1 to 1.0mm, whereby it becomes necessary in connection with the structure of larger laser devices to construct the expansion nozzle device from a plurality of very small Laval nozzles arranged in parallel. In such a device it is hard to cool the nozzles and the manufacturing costs are high.

OBJECTS OF THE INVENTION

In view of the foregoing, it is the aim of the invention to achieve the following objects, singly or in combination:

to provide a method for the operation of a gasdynamic $CO_2$ laser which makes it possible to overcome the drawbacks of the prior art, specifically to simplify the structure of a $CO_2$ gasdynamic laser device;

to reduce the weight of such laser devices, stated differently, to increase the power weight ratio, especially for laser devices of medium and large size;

to substantially reduce the fuel consumption of such devices; and to facilitate the cooling of the nozzle structure.

SUMMARY OF THE INVENTION

According to the invention there is provided a method for the operation of a gasdynamic $CO_2$ laser, wherein preferably only one liquid fuel component and preferably only one liquid oxidizer component is supplied into a combustion chamber, wherein the combustion chamber temperature is maintained above 2500° K and wherein the combustion chamber pressure is above 50 bar. The laser gases resulting from the combustion are caused to flow from the combustion chamber into the resonator space through a Laval nozzle device having an exit area which is at least 100 times larger than the entrance area at the nozzle neck. The neck diameter of the Laval nozzles is approximately 0.1 to 1.0mm, whereby a cooling of the combustion gases in the Laval nozzle arrangement to approximately 300° K takes place while simultaneously freezing the molecular states which permit a laser operation. According to the invention, fuels and oxidizers are used which comprise gas components such as CO, $O_2$, and NO in addition to the components necessary for the laser operation, namely, $N_2$, $CO_2$, and $H_2O$, whereby the proportion of $CO_2$ and $H_2O$ is preferably respectively lower than about 12% of the total gas quantity, and wherein the proportion of solid or liquid components is negligibly small. Small quantities of molecular nigrogen may be added to the fuel or fuel mixture without departing from the teachings of the invention. Such nitrogen addition influences the composition of the laser gas only to a negligible extent.

According to the invention, especially liquid fuels are employed or such fuels which are easily liquified and which may be easily stored in liquid form, such as hydrocarbons, for example, $C_6H_6$, $C_2N_2$, $C_7H_5N$, and $C_5H_5N$. Similarly, the oxidizers should also be in liquid form or in a form easily liquified and stored in liquid form, such as $N_2O$, NO, or $N_2O_4$.

The method according to the invention may be performed by a laser device employing elements which as such are known. However, the invention resides in their special combination, wherein the liquid fuel and the liquid oxidizer are stored in respective containers and supplied to the injection nozzles of the combustion chamber, preferably through conveying means extending through cooling jackets surrounding the combustion chamber, the expansion nozzle device and the diffuser. The expansion nozzle has a relatively small neck or entrance diameter compared to prior art devices, whereby the exit area of the preferably parallel gas stream into the resonator space is at least 100 times larger than the area of said neck. The gas flow is then compressed again, at least partially in a diffuser comprising one or several nozzles, whereupon the gas flow exits from the laser device. The inner surfaces of the combustion chamber and the nozzle devices arranged downstream, are provided with a corrosion resistant surface improvement, for example, in the form of a hard gold layer or any other suitable material. Hard gold alloys are known in the art and comprise gold, nickel, and indium in various proportions.

BRIEF FIGURE DESCRIPTION

In order that the invention may clearly understood, it will now be described, by way of example, with reference to the single FIGURE which shows a schematic longitudinal section through a $CO_2$ laser device, according to the invention.

DETAILED DESCRIPTION OF PREFERRED EXAMPLE EMBODIMENTS

The laser 1 according to the invention, comprises a combustion chamber 14 connected to a resonator space 10 by means of a Laval nozzle 19. A well known type of optical resonator, not shown for simplicity's sake, would be housed in the resonator space 10. A diffuser 13 forms the exhaust for the resonator. An afterburner 20 may be inserted in the exhaust as shown. The diffuser 13 is surrounded by a cooling jacket 11. A further cooling jacket 12 surrounds the combustion chamber 14 and the Laval nozzle 19.

A fuel tank 2 surrounded by an insulating jacket 4 is connected to the fuel injection nozzles 15 of the combustion chamber 14 by means of a fuel conveying conduit 8 which extends preferably through the cooling jacket 11 of the diffuser 13 as well as through the cooling jacket 12 by the combustion chamber 14. A pump 6 or some such fuel conveying mechanism may be employed to supply the fuel from the container 2 into the combustion chamber 14. Instead of the pump 6 pressure may be applied inside the tank 2 for the liquid fuel. A further tank 3 holds a liquid oxidizer and is also surrounded by an insulating jacket 5. A conduit 9 connects the tank 3 to the oxidizer injection nozzles 16 and 17 of the combustion chamber 14. Again, the oxidizer conduit 9 extends preferably through the cooling jacket 11 and through the cooling jacket 12. A pump 7 may be used to convey the liquid oxidizer through the conduit 9 or a pressure may be applied inside the oxidizer tank 3.

The cooling jacket 11 provides a regenerative cooling of the respective laser elements. The illustrated arrangement provides for a uniform combustion in the chamber 14 which is provided with well-known ignition means 21 which start the combustion and which either have their own fuel supply or which are also operatively connected to the liquid fuel tank 2 and the liquid oxidizer tank 3.

In operation, and as the result of a suitable liquid fuel and oxidizer combination, for example, using $C_6H_6$ and $N_2O$ with a molecular ratio of 1 to 9 and with a combustion chamber pressure of about 100 bar, the combustion chamber temperatures will reach to about 3,400° K, whereby the proportions of the gases required for the laser operation are about as follows: $CO_2$ approximately 6%, $H_2O$ approximately 10%, and nitrogen approximately 50%, the remainder comprising gases such as CO, $O_2$, and NO which influence the laser operation only to a negligible extent. Under these operation conditions the laser power may reach up to 140KW relative to a mass flow of 1KG per second.

Incidentally, the Laval nozzle 19 may comprise a plurality of individual nozzles as is well known in the art. However, according to the invention, a large number of very small nozzles is obviated.

It is desirable to have available in the resonator space 10 which follows the Laval nozzle 19 a supersonic parallel flow of an inverted laser gas with a temperature in the range of 300° K. For this purpose the invention teaches to cause the gas expansion, preferably through uni-dimensional nozzles of suitable contours which may be calculated by well known methods. To this end the resonator space 10 will preferably have a cross sectional area relative to the nozzle neck 18 which is about 200 times larger than the cross sectional are of the nozzle neck 18. To this end the neck diameter is in the range of 0.1 to 1.0mm.

Due to the high temperature in the combustion chamber 14 there is a certain exhaust of toxic combustion components or residues. However, this may be substantially avoided by employing, in a known manner, a afterburner 20 located in the diffuser 13 without influencing the basic operation. The afterburner combusts the toxic components so that the exhaust will contain $CO_2$ and $H_2O$.

In order to avoid corrosion damages, it is desirable to provide the inner walls of the combustion chambers as well as of the resonator 10 and the diffuser 13 with a corrosion resistant coating or protective layer, such as a layer of hard gold as mentioned above.

The method according to the invention, for operating a $CO_2$ laser device has certain advantages as compared to prior art exciting methods employing chemical reactions for the operation of gasdynamic $CO_2$ lasers. One important advantage is seen in that the operation at high stagnation temperatures results in a substantially higher laser power while the mass throughput is the same. Simultaneously, the combustion gases comprise but a small $CO_2$ proportion due to the thermal dissociation in the combustion chamber 14. This feature makes possible an inversion at high pressure which results in a compact laser device.

Another advantage of the invention is seen in that the combustion chamber needs to be supplied only with two liquid components without or only a small, negligible amount of nitrogen, whereby an extraordinary reduction in the volume and weight of the supply apparatus has been achieved. Further, the large area ratio of the Laval nozzle device in combination with the high stagnation temperatures, has the advantage that only one larger nozzle or a few nozzles may be required which can be cooled more effectively with simpler means. Such larger nozzles can also be manufactured by simpler means all of which goes to reduce the overall costs. The mentioned large area ratio also causes a low gas density in the resonator space which is advantageous for the optical homogeneity and the coherence of the decoupled laser beam. Another advantage of the invention is seen in that the working points and thus the stagnation temperature, the gas composition, and the stagnation pressure may be freely selected in a wide range simply by varying the mixing ratio between fuel and the oxidizer. Thus, the laser, according to the invention, is easily adaptable to a wide range of individual requirements or purposes.

Although the invention has been described with reference to specific example embodiments, it will be appreciated, that it is intended to cover all modifications and equivalents within the scope of the appended claims.

What is claimed is:

1. In a method for exciting a gas dynamic $CO_2$ laser, wherein the laser gas is produced by the combustion of conventional fuels and oxidizers, the improvement comprising supplying to a combustion chamber exclusively a fuel stored in liquid form and an oxidizer also stored in liquid form, reacting said liquid fuel and liquid oxidizer in said combustion chamber at a stagnation temperature above 2500° K and at a combustion chamber pressure above 50 bar, causing the laser gas generated by said combustion to flow through Laval nozzle means into a resonator, wherein the flow cross sectional area of said Laval nozzle means adjacent to said resonator is at least 100 times larger than its flow cross sectional area adjacent to the nozzle neck, the latter having a diameter of about 0.1 to 1.0mm, said flow through said Laval nozzle means cooling the laser gas to about 300° K thereby causing an inversion state, said liquid fuels and liquid oxidizers comprising substantially the components $N_2$, $CO_2$ and $H_2O$ as required for the laser operation, said $CO_2$ and said $H_2O$ components being present in proportions substantially below the $N_2$ proportion, said laser gas further comprising CO, $O_2$, and NO as thinner components.

2. The method of claim 1, wherein said fuel is present as a liquid fuel mixture, and wherein said oxidizer is present as a liquid oxidizer mixture.

3. The method of claim 2, wherein said liquid oxidizer mixture comprises a minor proportion of molecular nitrogen.

4. The method of claim 1, comprising using as said liquid fuels hydrocarbons such as $C_6H_6$, $C_2N_2$, $C_7H_5N$, $C_5H_5N$, and using as said liquid oxidizer nitrogen oxygen compounds such as $N_2O$, NO, and $N_2O_4$.

5. The method of claim 4, wherein said liquid fuels and liquid oxidizer are of the kind easily stored in liquid form.

6. A gas dynamic $CO_2$ laser comprising combustion chamber means, resonator means, nozzle means interconnecting said combustion chamber means and said resonator means, said nozzle means having an exit cross sectional area and entrance cross sectional area, said exit cross sectional area being at least 100 times larger than said entrance cross sectional area, diffuser means operatively connected to said resonator means, first cooling jacket means arranged around said diffuser means, second cooling jacket means arranged around said combustion chamber means and around said nozzle means, first container means for a liquid fuel, second container means for a liquid oxidizer, injection nozzle means leading into said combustion chamber means, liquid conveying means operatively connecting said injection nozzle means to the respective one of said first and second container means, said liquid conveying means including liquid conduit means extending through said first and second cooling jacket means, and wherein said combustion chamber means, said nozzle means, and said diffuser means have corrosion resistant inner surfaces, said laser further comprising gas afterburner means operatively connected to said diffuser means.

7. The laser of claim 6, wherein said corrosion resistant inner surfaces of said combustion chamber means, of said nozzle means, and of said diffuser means comprise a layer of hard gold forming said inner surfaces.

8. The laser of claim 6, wherein said liquid conveying means comprise pump means operatively interposed in said liquid conduit means.

9. The laser of claim 6, including insulating means surrounding said container means.

10. The laser of claim 6, wherein said nozzle means has an entrance or neck diameter substantially within the range of 0.1 to 1.0mm and an exit diameter substantially within the range 10 to 100mm.

* * * * *